Nov. 3, 1964
C. JONES ETAL
3,155,085
INTERNAL COMBUSTION ENGINE WITH SPARK PLUG SUBJECT
TO HIGH TEMPERATURE OPERATING CONDITIONS
Filed April 29, 1963
3 Sheets-Sheet 1
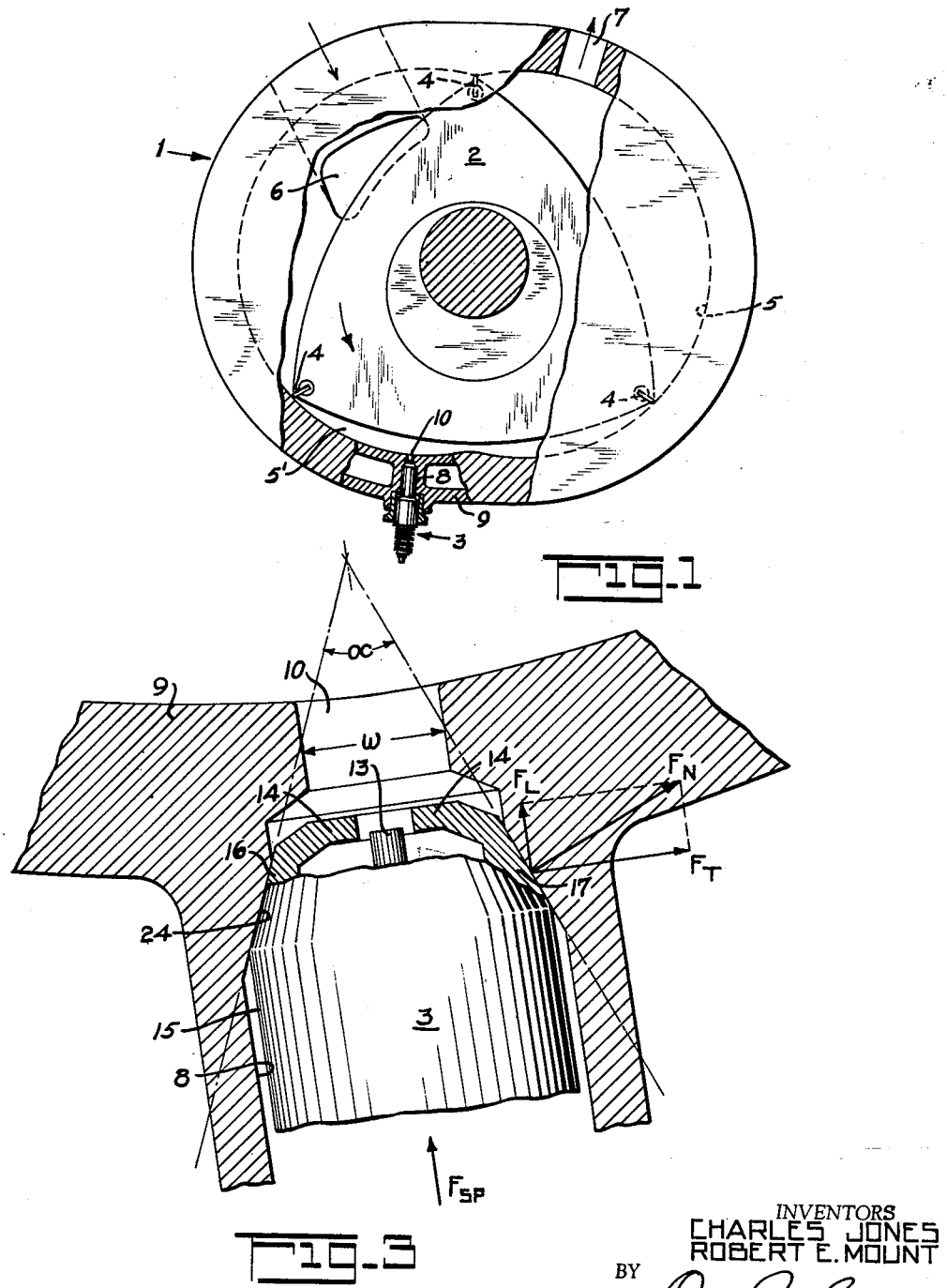
INVENTORS
CHARLES JONES
ROBERT E. MOUNT
BY
THEIR ATTORNEY

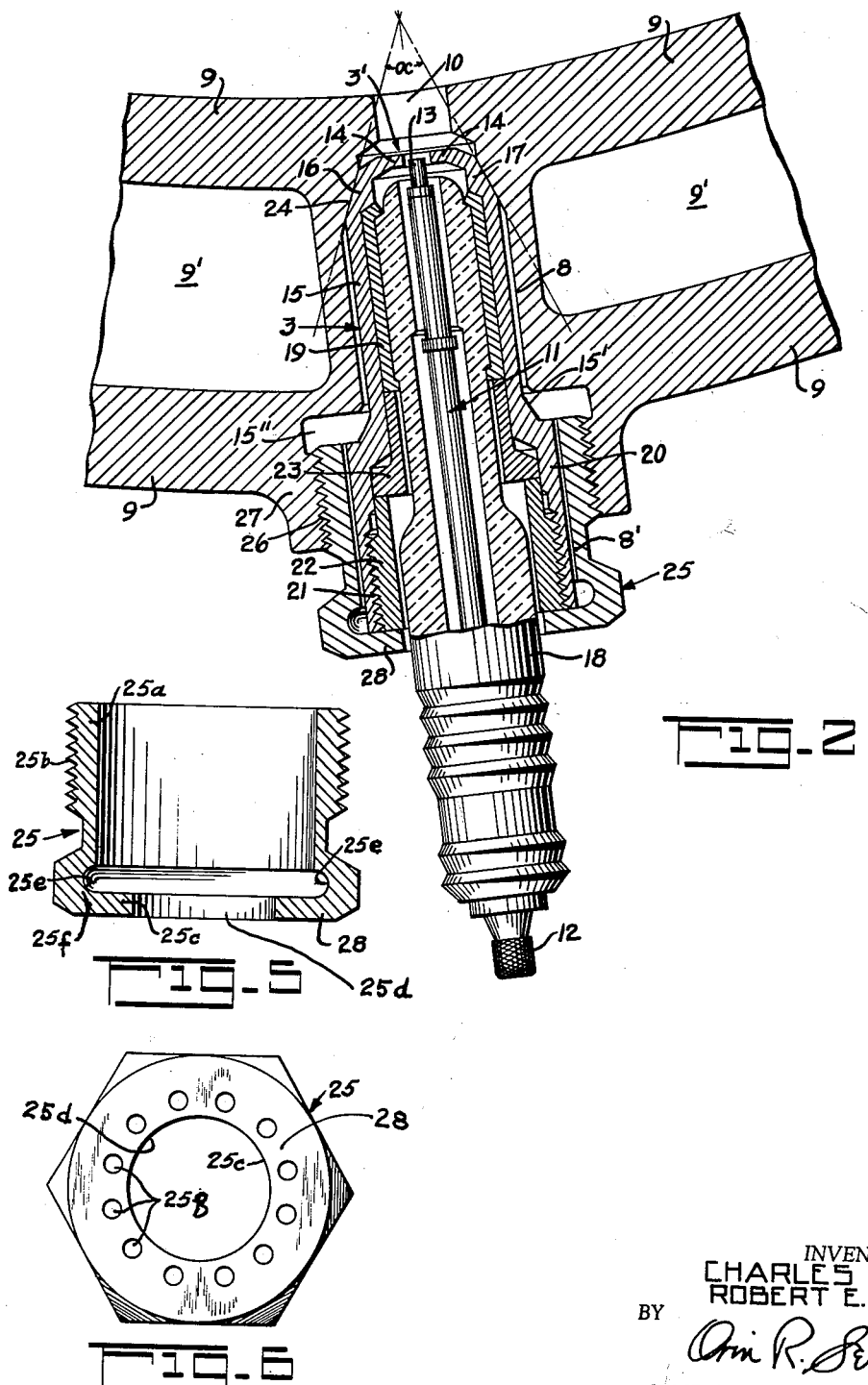

INVENTORS
CHARLES JONES
ROBERT E. MOUNT
BY

THEIR ATTORNEY

United States Patent Office 3,155,085
Patented Nov. 3, 1964

3,155,085
INTERNAL COMBUSTION ENGINE WITH SPARK PLUG SUBJECT TO HIGH TEMPERATURE OPERATING CONDITIONS
Charles Jones, Paramus, and Robert E. Mount, Pine Brook, N.J., assignors to Curtiss-Wright Corporation, a corporation of Delaware
Filed Apr. 29, 1963, Ser. No. 276,589
6 Claims. (Cl. 123—169)

This invention relates to internal combustion engines of the electrical ignition type having spark plugs that are subjected in certain cases to unusually high operating temperatures.

A troublesome problem of spark plug cooling and sealing may be present where the firing end of the plug, including the plug shell or casing, electrodes, and ceramic insulation, is for practical purposes continuously exposed to high operating temperatures of the combustion chamber. In certain types of internal combustion engines, as for example the rotary-piston type wherein the firing end of the spark plug is recessed within its guide bore or "pilot," the plug does not receive the full benefit of periodic cooling as in the case of the reciprocating-piston type, during that part of the cycle where a fresh, comparatively cool, gas-air mixture charge is brought into the combustion chamber. In such instances, the spark plug and its mounting have been subjected to severe stresses and/or deterioration due to build-up of very high temperatures in the region of the plug firing tip and the adjacent pilot wall. Further, where the combustion chamber wall is composed of a lightweight alloy, such as an aluminum alloy used in modern engine design, high operating temperatures tend to create another problem by relaxing the normally tight seal required between the plug and its pilot seat. That is, the resulting unequal expansions of the metal jacket or cylinder (usually steel) of the spark plug, and the alloy constituting the combustion chamber wall produce a so-called relative "thermal growth" between the plug cylinder and chamber wall, especially along the longitudinal axis of the pilot so as to loosen the seal. Further, in some instances high local mechanical stresses initially caused by the plug sealing force (due to reduced strength of the alloy with temperature rise) tend to distort the pilot seat structure and adjacent chamber wall to cause bulging in the direction of the combustion chamber.

Where the plug is seated by force transmitted through conventional screw threads in the pilot wall and plug jacket, a further problem of "double-piloting" may be present due to slight misalinement of the inclined screw-thread surfaces and the pilot seat. This can result in overstressing and consequently imperfect sealing.

A principal object of the present invention therefore is to provide in an internal combustion engine of the above-described type an improved spark plug and mounting arrangement wherein the rate of heat transfer from the plug, particularly at its firing end, is materially increased so as to minimize plug and pilot seat deterioration, unusual mechanical stresses between the plug and chamber wall tending to distort the wall are minimized, ignition and gas-scavenging action are improved, and wherein "double-piloting" is eliminated and the plug maintained at all times in good sealing relation to the combustion chamber.

In practicing the present invention in a preferred form, improved heat transfer from the firing end of the spark plug to the immediate portion of the pilot wall, together with positive and effective sealing, are obtained by freely mounting the plug within the pilot and biasing it so that the lower end of the plug is seated in concentric conical relation to the pilot. In particular, the plug is clamped by adjustable resilient means onto a conical seat in the pilot so as accurately to center the plug on the pilot seat, establish the plug seal, and ensure good heat transfer from the firing end of the plug. By so preventing build-up of excessive heat at the plug-tip region, optimum recessing of the plug tip and seal is also made possible, resulting in improved ignition and gas-scavenging action.

The invention will be more fully set forth in the following description referring to the accompanying drawings, and the features of novelty will be pointed out with particularity in the claims annexed to and forming a part of this specification.

Referring to the drawings,

FIG. 1 illustrates a general application of the invention to a known type of rotary piston, 4-cycle, internal combustion engine;

FIG. 2 is an enlarged view, partly in section, of that part of the engine including the spark plug, seal, and mounting arrangement of the present invention;

FIG. 3 is an enlarged detail view of the firing end of the plug, also illustrating vectorially the plug sealing and other forces at the conical pilot seat;

FIGS. 5 and 6 are elevation and plan views respectively of the resilient clamp or ferrule shown in FIG. 2 for obtaining sealing pressure.

Figure 7:
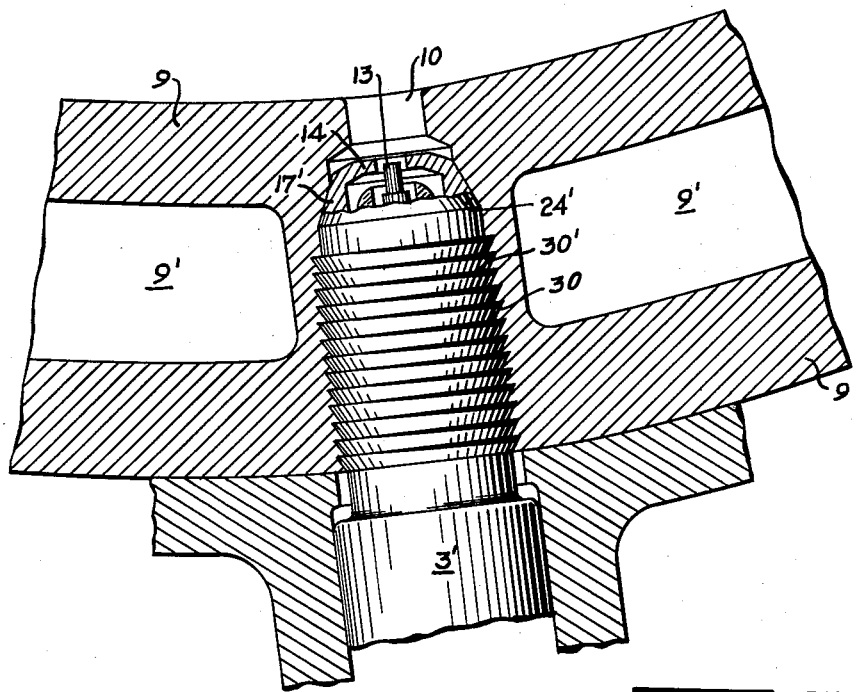
FIG. 7 is a partial view of a modified form of the invention.

In FIG. 1, a so-called rotary combustion engine is generally indicated at 1 having a rotary piston 2 and an ignition spark plug 3 that is electrically connected to a suitable ignition system (not shown). A detailed description of the engine per se is not necessary for an understanding of the present invention, it being sufficient to state that the rotary piston comprises a multi-lobe member that is so mounted for eccentric rotation in the direction indicated that the apex seal 4 of each lobe traces an epitrochoid. This trace defines the configuration of the inner wall 5 of the engine including the combustion chamber 5'. Intake and exhaust ports are indicated at 6 and 7, respectively. An engine of this type is disclosed by way of example in U.S. Patent No. 3,081,753, granted March 19, 1963.

It will be noted that the apex seals 4 are in wiping contact at all times with the engine wall 5 so as to form a proper gas seal during the 4-cycle operation of the engine. Accordingly, the spark plug 3 is necessarily recessed more or less within its pilot 8, the extent of recessing depending on practical operating considerations. In the present instance, the firing end of the plug is located within a cavity or recess formed at the chamber-end of the pilot in immediate communication with the combustion chamber 5', in contrast to a conventional reciprocating piston engine wherein the firing end of the plug may extend a short distance into the combustion chamber itself.

As previously indicated, the inherent operation of the rotary combustion engine presents a special problem in cooling the region at the firing end of the plug not present in the conventional piston engine. This problem involves primarily two factors, namely (1) The rate of heat transfer from the plug tip to the engine housing, and (2) Effective scavenging of the hot gases in the recess at the plug tip for ensuring proper ignition, etc.

It follows that excessively high temperatures will build up if the heat transfer rate is too low, and also that scavenging of hot gases is insufficient if the plug tip and seal are recessed too far from the combustion chamber. Excessively high temperatures at the spark tip cause not only more rapid deterioration of the spark plug and its pressure seal, but also tend to cause distortion or bulging of the combustion chamber wall in the immediate area of the pilot seat; that is, the required sealing force pressing the plug against its seat tends to distort or warp the underlying alloy wall immediately surrounding the pilot recess entrance. Irrespective of sealing pressure, high thermal gradients incident to high operating temperatures can set up high stresses which in themselves tend to distort or warp the chamber wall. Such damage may result in engine failure.

Referring in more particular to the specific plug and seal structure shown by FIG. 2, the spark plug 3 departs from conventional design, especially as to its sealing and mounting arrangement in the engine. The conventional screw threads normally used on the plug for securing it in its pilot are entirely omitted so that the plug can be freely mounted in the pilot 8. In this instance the spark plug recess or pilot is formed as a cylindrical bore terminating in a variable diameter passage extending through the combustion chamber wall 9, the diameter being restricted as presently described at the firing end 3′ of the plug to form a plug sealing surface, and being further restricted at the combustion chamber to form a passage 10 interconnecting the ignition space at the plug tip and the combustion chamber 5′. The passage 10 is of optimum width $w$ for (1) Avoiding excessive restriction that would cause misfiring or faulty ignition, and (2) Avoiding excessive bypassing of pressure as the apex seal 4 passes this opening in the wall.

The specific construction of the spark plug shown by way of example includes a central electrode 11 extending from the external ignition circuit terminal 12 axially through the plug to the firing end where it terminates in an arcing tip 13 composed of a suitable arc resisting material. The complementary electrode 14 is formed as lateral extensions of a reduced portion 16 of the usual metal shell or cylinder 15, that in turn is in electrical contact with and grounded to the engine housing. This electrode forms as shown symmetrical spark gaps at opposite sides of the electrode tip 13. It will be understood of course that any suitable configuration of the electrodes to form the spark gap may be used.

The plug cylinder 15 adjacent to the firing end also is shaped as shown to form a frusto-conical sealing portion 17 hereinafter described in more detail.

The central electrode 11 is insulated from the metal cylinder 15 by the usual ceramic sleeve 18 that extends as shown throughout the length of the plug to a point near the spark gap. A heat conducting bushing 19, such as a copper sleeve, may be conveniently inserted between the ceramic sleeve and metal cylinder throughout a portion of the plug length near the hot or firing end.

The opposite end of the plug at the terminal 12 is formed by an enlarged section 20 of the metal cylinder. This section is internally threaded at 21 to receive a retaining bushing 22 for holding in position a spacing bushing 23 that abuts the copper sleeve 19. This sleeve in turn may be crimped as shown at its opposite ends over corresponding shoulders on the ceramic insulator.

The seal between the exterior surface of the plug and the combustion chamber wall at the pilot is made between the frusto-conical portion 17 of the plug and the conical seat 24 formed in the pilot. For reasons previously stated, this seat is an optimum distance from the combustion chamber. The corresponding cone angles at the coacting sealing surfaces correspond so that under moderate sealing force an efficient and practical pressure seal at the cone surfaces is provided.

For providing this sealing force and thereby preventing pressure loss past the plug, the plug is biased or clamped onto its pilot seat in the wall 9 preferably by suitable resilient means interconnecting the wall and the plug. In a preferred arrangement found to be satisfactory, a ferrule or the like 25, having a screw-threaded connection at 26 with a boss 27 on the housing wall, has formed thereon at one end a resilient springlike retaining flange 28 that extends over the enlarged end 20 of the plug cylinder so as to hold the plug firmly on its seat (seal) in the pilot. The ferrule is rotatable in the boss 27 so as to vary the spring tension at the ferrule flange and thereby adjust the plug sealing pressure at the above-described conical surfaces. As the plug per se has no threaded engagement with the housing and is freely positioned in the pilot, it will now be apparent that no "double-piloting" can occur; also, it will be apparent that the resilient flange of the ferrule can be formed as required (i.e. by reduction of thickness, slotting, etc.) to produce a predetermined "soft spring" bias per degree of ferrule rotation or a comparatively stiff bias, depending on the temperature-stress characteristics of the metal forming the conical sealing seat 24.

The above ferrule construction of FIG. 2 is shown more clearly by FIGS. 5 and 6. The ferrule 25 comprises a cylinder or ring 25a arranged to fit freely over the enlarged portion 20 of the plug shell. The exterior surface of the ring is screw threaded at 25b, preferably for fine-pitch, for engaging corresponding threads in the housing boss 27, FIGS. 2 and 6. The outer end of the ring has an enlarged diameter portion 25c with a re-entrant circular flange 28 that loosely surrounds the ceramic plug portion 18 at the central opening 25d and overhangs the outer end of the plug casing portion 20.

For providing desired spring-biasing effect on the plug, the ring is undercut at 25e so that the flange connection to the ring proper is in the form of a loop 25f. The cross-sectional area of the loop portion can be selected to produce the proper spring characteristic as previously stated. Additional resiliency may be added if desired by reducing the thickness of the overhang portion and/or slotting as indicated at 25g in FIG. 6. The periphery of the spring-flange 28 may be shaped as in FIG. 6 to accommodate a conventional tightening tool.

Considering in more detail the sealing surfaces and referring to FIG. 3, the cone angle $\alpha$ of the pilot seat 24 is preferably small, the lower limit of this angle being primarily determined by avoiding factors, namely (1) Avoidance of a self-locking taper, and (2) Avoidance of excessively high tensile "hoop stresses" tending to distort and damage the surrounding seat structure, particularly at high temperatures.

In practice, an angle within the range of 30° to 45° has been found satisfactory.

The cone angle of the frusto-conical plug sealing portion 17 is measured as indicated in FIG. 3; that is, the cone angle apex is at the longitudinal axis of the plug. The full cone angle is shown here as 45° so that the cone slope angle is 22½°. The pilot seat slope angle is also 22½° measured with respect to the longitudinal axis of the pilot. For practical purposes of production, the slope angles of the plug con and seat cannot separately be made closer in correspondence than approximately ±¼°. For this angle tolerance it has been found that if the nominal cone slope angle (22½°) of the pilot seat is during production made ½° larger than that of the plug seal angle, then, assuming this worst possible angle combination, the frustro-conical portion of the plug will simply make circular line contact with the pilot seat near its minimum internal diameter. In such instances, normal biasing pressure at the ferrule causes sufficient elastic deformation of the softer metal at the pilot seat to bring the cone angles into coinincidence for all practical purposes of pressure sealing and good heat transfer.

The forces acting on the conical pilot seat 24 for a given spring pressure $F_{SP}$ are vectorially represented in FIG. 3 as $F_N$, the required sealing force acting normal to the pilot seat 24; $F_T$, the force component acting transversely of the pilot axis, and $F_L$, the force component acting in the longitudinal direction of the axis. It will be noted that the component $F_T$ which tends to set up so-called "hoop stresses" in the adjacent wall 9 decreases, and the component $F_L$ which tends to produce wall distortion increases for a given required sealing force $F_N$ when the cone slope angle is increased, and vice versa. An optimum is reached when the slope angle is such that $F_T$ and $F_L$ are both within tolerable limits. This determines the best practical pressure sealing and heat transfer areas. The significant feature here is that a satisfactory disposition of mechanical forces is also attended by an enlarged and efficient heat conducting path to the cooler part of the engine housing. The housing itself may include suitable heat dissipating means, such as fluid cooling passages 9', an example being shown in U.S. Patent No. 3,007,460, granted November 7, 1961.

For a given engine, the plug sealing mechanical stress must exceed a certain minimum for proper gas sealing and good heat transfer. As above indicated, the axial seating force on the plug (which can be determined from the ferrule "spring" characteristics) is readily varied, even in very small increments, by rotation of the ferrule a few degrees, according to the selected pitch of the ferrule screw threads. Assuming initial "cold" adjustment of the ferrule for proper plug sealing, the compression seal is thereupon maintained as the engine is brought from "cold-start" to normal operation, notwithstanding relative thermal "growth" of the plug itself and the housing wall.

Figure 4:
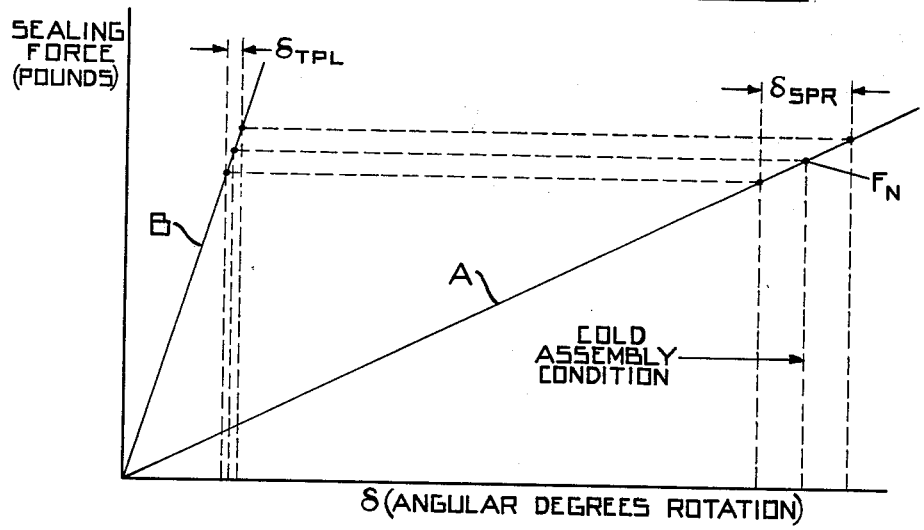
FIG. 4 is a comparative graphical illustration of relations between the plug adjustment displacement and the resulting sealing forces at the pilot seat.

The practical advantages of this feature are graphically indicated in FIG. 4 wherein the coordinates represent respectively the clamping or seating force (in pounds) $F_L$, and relative displacement $\delta$ of the adjustable means for producing sealing pressure. Curve A represents the arrangement of the present invention wherein the ferrule clamping force is variable over a wide range of ferrule rotation or displacement to produce the desired sealing force (indicated at point $F_N$) at the pilot seat. It will be noted that the ferrule also provides for a practical range of spring adjustment $\delta_{SPR}$ with respect to the "cold assembly" condition, whereas the conventional threaded plug, curve B, is adjustable only within a highly critical range $\delta_{TPL}$ to vary the sealing pressure at a given operating temperature.

An important advantage of this invention previously indicated concerns improved disposition of the plug firing end and seal with respect to the combustion chamber. A practical problem ordinarily requiring material compromise is present in the use of conventional spark plugs in a rotary combustion engine. At starting and low speeds combustion chamber ignition is more effective when the plug tips are near the pilot entrance to the combustion chamber, the effectiveness of the spark plug in igniting the fuel-air mixture decreasing as the plug tips are retracted into the pilot. However, for high speed, high temperature operation, the conventional spark plug must be located in a comparatively retracted position, due primarily to excessively high temperatures that otherwise might build up in the region of the plug seal and firing end.

It will be noted, FIGS. 2 and 3, that in accordance with the present invention the arcing electrodes of the plug and the seal are closely adjacent to the restricted passage 10 leading directly to the combustion chamber. The pilot sealing seat 24 which is subjected to the clamping force of the ferrule, obviously requires a definite amount of back-up or reinforcing wall structure. If the wall is too thin, warping or bulging will occur when the seal supporting wall is subjected to a combination of high temperature and plug sealing pressure. Accordingly, the spacing between the combustion chamber proper and the pressure seal, heat transfer areas has a definite minimum limit for a given wall alloy material and given values of maximum operating temperature and longitudinal force component $F_L$. In practice, it has been found that a wall thickness (as determined by this spacing) of approximately ¾ inch, where the wall is composed of aluminum alloy, is satisfactory for good sealing at usual engine temperatures.

It follows therefore as previously stated that where the firing end of the plug with its seal can be safely advanced toward the combustion chamber to decrease the aforesaid spacing, both overall ignition and gas scavenging are improved. Summarizing, this spacing is actually decreased by the present invention, primarily by materially increased transfer of heat from the plug tip and adjacent seal to the engine wall (cooling jacket), and by more precise regulation of the longitudinal "bulging" force component $F_L$. It will now be evident in the improved combination of this invention that certain features also enhance the effectiveness of others. For example, as the cone seat slope is made steeper thereby increasing the effective sealing force $F_N$, the heat transfer area at the cone seat is also increased; furthermore, the plug free-mounting and biasing arrangement not only avoids "double-piloting" but also minimizes the likelihood of wall bulging by reason of the more precise "soft spring" adjustment of force $F_L$.

A modified arrangement as shown in FIG. 7 may be used in certain instances where the chamber wall 9 is composed of a material (such as cast iron) that is not as susceptible to bulging at high temperatures. In this arrangement the ferrule is omitted, and the plug and pilot wall are provided with buttress-type screw threads 30 that permit proper centering of the frustro-conical plug seal 17' on its seat 24' in the pilot. Here, the comparatively flat surfaces 30' of the buttress thread permit the slight lateral adjustment of the plug required for alinement of the longitudinal axis of the plug and that of the pilot seat to avoid "double-piloting." In this arrangement the precise vernier-like adjustment of sealing force attainable by a "soft spring" ferrule construction, referring to FIG. 4, is not possible. However, the arrangement is within the scope of the present invention and is practical under certain conditions as above pointed out.

It should be understood that this invention is not limited to specific details of constructions and arrangement thereof herein illustrated, and that changes and modifications may occur to one skilled in the art without departing from the spirit of the invention.

What is claimed is:

1. In an internal combustion engine subject to high operating temperatures, the combination of
   (a) a metal housing, a portion of which forms a wall of the engine combustion chamber,
   (b) said chamber wall having a spark plug pilot that is cylindrical throughout a portion of its length and restricted in cross-sectional area at its end adjacent to the chamber to form a conical seat concentric with the pilot, the conical seat being spaced from said combustion chamber,
   (c) a spark plug freely mounted for limited lateral adjustment within the pilot, said plug including a metal cylinder terminating in a frustro-conical portion at the firing end of the plug and corresponding in cone angle to said conical seat for making a metal-to-metal sealing fit therewith,
   (d) and means interconnecting said spark plug and housing for holding said plug in the pilot and forcing it into firm sealing engagement with said conical pilot seat, and for causing variation of the plug seating force in accordance with adjustment of said means, said holding means allowing limited transverse movement of the plug within the pilot for centering on the conical seat and thereby correcting slight misalinement of the plug and pilot axes,
   (e) the common slope of said pilot seat and corresponding frustro-conical portion forming a sharp acute angle with respect to the longitudinal axis of the pilot seat and having an optimum value whereby the longitudinal force component tending to cause bulging of the chamber wall in close proximity to the combustion chamber is materially less than the required sealing force normal to the pilot seat, and a comparatively large cone seat surface area is provided for effective pressure sealing and high rate of heat transfer from the plug-tip region of the metal cylinder to the housing wall.

2. In an internal combustion engine subject to high operating temperatures, the combination of
  (a) a metal housing, a portion of which forms a wall of the engine combustion chamber,
  (b) said chamber wall having a spark plug pilot that is cylindrical in form throughout a major part of its length and at its end nearest the chamber forms a conical seat concentric with the pilot,
  (c) a generally cylindrical spark plug freely mounted for limited lateral adjustment within the pilot, said plug including a metal cylinder terminating at a frustro-conical portion adjacent to the firing end of the plug and corresponding in cone angle to said conical seat for making a gas sealing fit therewith,
  (d) and resilient mounting means interconnecting said housing and said spark plug for soft-spring bias of said plug into gas sealing engagement with said pilot seat,
  (e) said biasing means providing for relative thermal expansion between the plug cylinder and chamber wall along the longitudinal axis of said pilot, while maintaining both a pressure seal and a good thermal conducting path from said frustro-conical portion to said conical pilot seat thereby facilitating transfer of excess heat from the immediate region of the plug firing end to the engine housing.

3. Apparatus as specified in claim 1 wherein the space formed by the minimum diameter portion of the conical pilot seat communicates directly with the combustion chamber through a short cylindrical passage of lesser diameter, and the firing end of the plug is located substantially at the entrance to said passage opposite the combustion chamber.

4. Apparatus as specified in claim 2 wherein the resilient mounting means comprises a flexible metal ring loosely surrounding the plug at the outer wall of the engine housing, said ring having a circular inwardly extending spring flange for bearing against the exterior portion of the plug, said ring being operatively connected to said housing for adjustment along the longitudinal axis of the pilot for in turn flexing said spring flange and adjusting the plug sealing force coincident with free centering of the plug on said conical seat.

5. Apparatus as specified in claim 4 wherein the ring is formed as a ferrule having an inwardly extending flexible flange that engages the outer end of the metal cylinder, and the ferrule has screw-threaded engagement with said housing whereby rotation of the ring causes movement thereof along the longitudinal axis of the pilot to vary the spring tension at said flange and thereby adjust the plug sealing force at the pilot seat.

6. Apparatus as specified in claim 1 wherein the plug holding means includes coacting buttress-type screw threads formed in the corresponding side walls of the pilot and metal cylinder respectively, the comparatively flat buttress side of the pilot wall thread being disposed so that the plug sealing force is normal thereto thereby providing for limited lateral movement of the plug to ensure self-alinement thereof with the conical pilot seat.

References Cited in the file of this patent

UNITED STATES PATENTS

| | | |
|---|---|---|
| 1,142,369 | Schmidt | June 8, 1915 |
| 1,738,610 | Rabezzana | Dec. 10, 1929 |
| 1,848,065 | Rabezzana | Mar. 1, 1932 |
| 2,012,699 | Walters | Aug. 27, 1935 |
| 2,273,990 | Rabezzana | Feb. 24, 1942 |

FOREIGN PATENTS

| | | |
|---|---|---|
| 168,019 | Great Britain | Oct. 22, 1920 |